United States Patent
Gladden

(10) Patent No.: US 6,601,388 B1
(45) Date of Patent: Aug. 5, 2003

(54) TURBOCHARGER WITH ENHANCED COMPRESSOR BLEED CAPABILITY

(75) Inventor: John R. Gladden, Lafayette, IN (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/943,188

(22) Filed: Aug. 30, 2001

(51) Int. Cl.⁷ ............................................. F02B 33/44
(52) U.S. Cl. ......................... 60/606; 60/612; 60/605.1
(58) Field of Search .................. 60/600, 601, 602, 60/603, 605.1, 606, 612, 611; 415/157, 164, 120

(56) References Cited

U.S. PATENT DOCUMENTS

| | | | |
|---|---|---|---|
| 3,044,683 A | | 7/1962 | Woollenweber, Jr. ......... 60/606 |
| 4,082,477 A | * | 4/1978 | Kronogard ................... 415/120 |
| 4,367,626 A | * | 1/1983 | Schwartzman ............... 60/606 |
| 4,373,336 A | * | 2/1983 | Horler et al. ................. 60/606 |
| 4,378,677 A | * | 4/1983 | Zumstein ..................... 60/606 |
| 4,499,731 A | * | 2/1985 | Moser ......................... 415/157 |
| 4,619,590 A | * | 10/1986 | Johnson ....................... 417/407 |
| 4,657,476 A | * | 4/1987 | Berg ........................... 415/164 |
| 4,833,886 A | * | 5/1989 | Meier ........................... 60/602 |
| 5,406,796 A | * | 4/1995 | Hiereth et al. ................ 60/606 |
| 5,724,813 A | | 3/1998 | Fenelon et al. ............... 60/606 |
| 6,035,638 A | * | 3/2000 | Lamsbach et al. ............ 60/602 |
| 6,324,848 B1 | * | 12/2001 | Gladden et al. .............. 60/612 |
| 6,345,503 B1 | * | 2/2002 | Gladden ...................... 60/612 |
| 2001/0035171 A1 | * | 11/2001 | Kim et al. .................... 60/602 |

FOREIGN PATENT DOCUMENTS

| | | |
|---|---|---|
| DE | 38 07 372 A | 9/1989 |
| DE | 100 48 408 A1 | 5/2001 |
| EP | 1 191 208 A2 | 3/2002 |
| FR | 1 012 365 | 7/1952 |

* cited by examiner

*Primary Examiner*—Thomas Denion
*Assistant Examiner*—Thai-Ba Trieu
(74) *Attorney, Agent, or Firm*—Taylor & Aust; Raymond W. Campbell

(57) ABSTRACT

A turbocharger for an internal combustion engine, particularly suitable for use in a work machine, is provided with a turbine having a low pressure region of minimum static pressure. A compressor has a high pressure region of maximum dynamic pressure. A conduit fluidly interconnects the high pressure region with the low pressure region. A valve is associated with the conduit for opening and closing the conduit. Compressed air or a fuel/air mixture may be bled from the compressor to the turbine over a wider arrange of operating conditions, even at low load operating conditions.

18 Claims, 1 Drawing Sheet

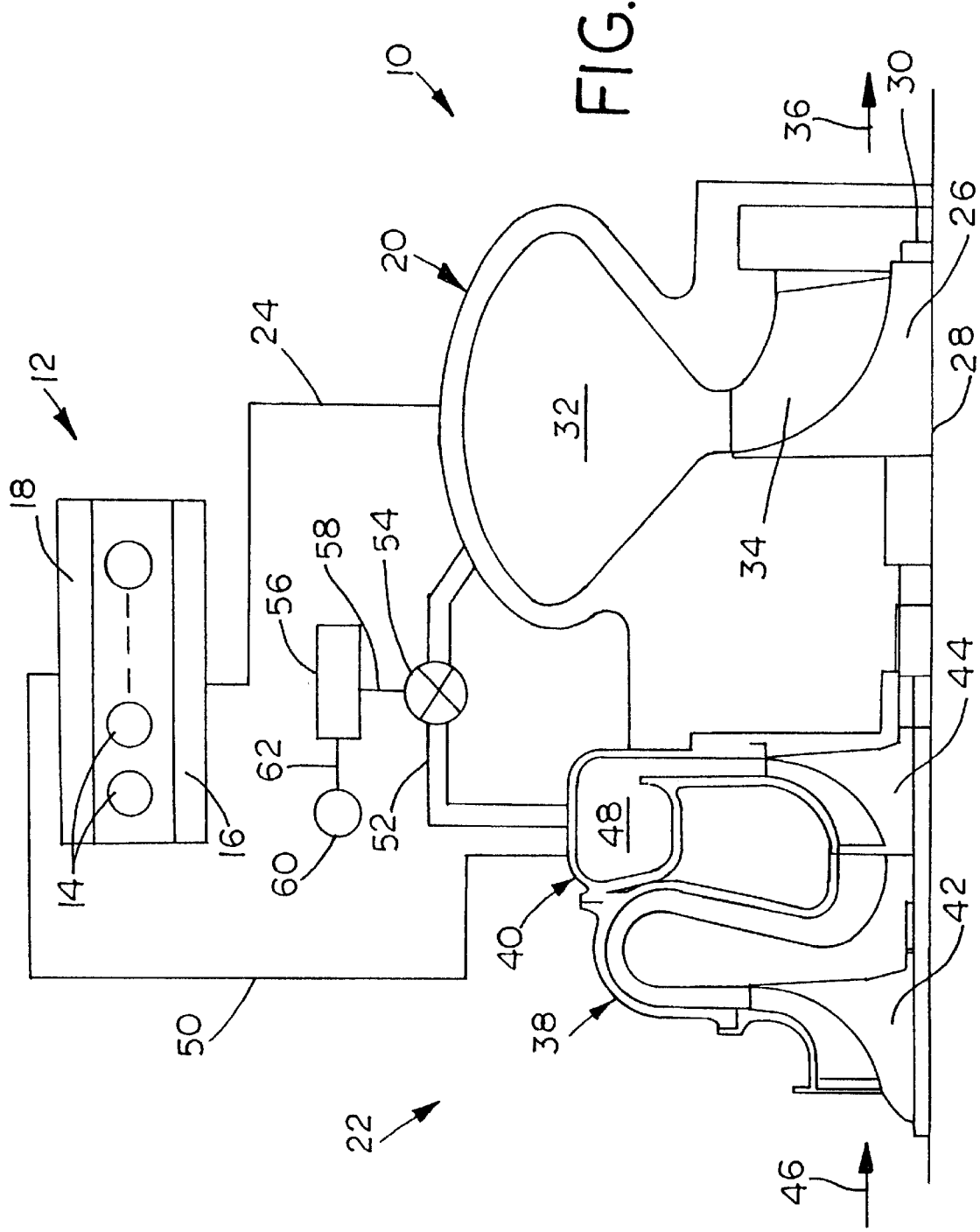

TURBOCHARGER WITH ENHANCED COMPRESSOR BLEED CAPABILITY

TECHNICAL FIELD

The present invention relates to a turbocharger for use in an internal combustion engine, and, more particularly, to a turbocharger including a multi-stage compressor.

BACKGROUND

An internal combustion engine may include one or more turbochargers for compressing a fluid which is supplied to one or more combustion chambers within corresponding combustion cylinders. Each turbocharger typically includes a turbine driven by exhaust gases of the engine and a compressor which is driven by the turbine. The compressor receives the fluid to be compressed and supplies the fluid to the combustion chambers. The fluid which is compressed by the compressor may be in the form of combustion air or a fuel/air mixture.

The operating behavior of a compressor within a turbocharger may be graphically illustrated by a "compressor map" associated with the turbocharger in which the pressure ratio (compression outlet pressure divided by the inlet pressure) is plotted on the vertical axes and the flow is plotted on the horizontal axes. In general, the operating behavior of a compressor wheel is limited on the left side of the compressor map by a "surge line" and on the right side of the compressor map by a "choke line". The surge line basically represents "stalling" of the air flow in the compressor. With too small a volume flow and too high a pressure ratio, the flow will separate from the suction side of the blades on the compressor wheel, with the result that the discharge process is interrupted. The air flow through the compressor is reversed until a stable pressure ratio by positive volumetric flow rate is established, the pressure builds up again and the cycle repeats. This flow instability continues at a substantially fixed frequency and the resulting behavior is known as "surging". The choke line represents the maximum centrifugal compressor volumetric flow rate, which is limited for instance by the cross-section at the compressor inlet. When the flow rate at the compressor inlet or other location reaches sonic velocity, no further flow rate increase is possible and choking results. Both surge and choking of a compressor should be avoided.

U.S. Pat. No. 3,044,683 (Woollenweber) discloses a fluid passage extending from the high pressure side of the compressor to the inlet side of a turbine. A spring loaded valve is disposed within the fluid passage and opens upon a high pressure condition within the compressor. The spring loaded valve thus merely acts to bypass some of the high pressure gas on an over pressure condition to the turbine of the turbocharger.

U.S. Pat. No. 5,724,813 (Fenelon et al.) assigned to the assignee of the present invention, discloses a turbocharger having a single stage compressor. A portion of the compressed gas from the single stage compressor may be recirculated to the outlet side of the turbine using controllably actuated valves. The control scheme utilizes only a single stage compressor.

The present invention is directed to overcoming one or more of the problems as set forth above.

SUMMARY OF THE INVENTION

In one aspect of the invention, a turbocharger for an internal combustion engine is provided with a turbine having a low pressure region of minimum static pressure. A compressor has a high pressure region of maximum dynamic pressure. A conduit fluidly interconnects the high pressure region with the low pressure region. A valve is associated with the conduit for opening and closing the conduit.

In another aspect of the invention, a method of operating a turbocharger in an internal combustion engine is provided with the steps of: providing a turbine coupled with a compressor; driving the turbine with exhaust gas from an exhaust manifold of the internal combustion engine, rotatably driving the compressor with the turbine; transporting combustion air through a high pressure region of maximum dynamic pressure within the compressor; transporting exhaust gas through a low pressure region of minimum static pressure within the turbine; fluidly interconnecting a conduit between the high pressure region and the low pressure region; and operating a valve associated with the conduit to selectively open and close the conduit.

BRIEF DESCRIPTION OF THE DRAWINGS

FIG. 1 is a schematic representation of an embodiment of a turbocharger of the present invention for use with an internal combustion engine.

DETAILED DESCRIPTION

Referring now to the drawing, there is shown an embodiment of a turbocharger 10 for use with an internal combustion engine 12. Internal combustion engine 12 generally includes a plurality of combustion cylinders 14, only three of which are shown for simplicity sake in the drawing. The particular number of combustion cylinders 14 within internal combustion engine 12 may vary, depending upon the particular application. Internal combustion engine 12 also includes an exhaust manifold 16 and an inlet manifold 18. Inlet manifold 18 provides air or a fuel/air mixture to combustion cylinders 14. Exhaust manifold 16 receives exhaust gas from combustion cylinders 14. Exhaust manifold 16 and inlet manifold 18 are shown with a single part construction for simplicity sake in the drawing. However, it is to be understood that exhaust manifold 16 and/or inlet manifold 18 may be constructed as multiple-part manifolds, depending upon the particular application.

Turbocharger 10 includes a turbine 20 and a two stage compressor 22. Turbine 20 is fluidly coupled with exhaust manifold 16 as indicated schematically by line 24. Turbine 20 includes a turbine wheel 26 is rotatable about a longitudinal axis 28 of shaft 30. More particularly, turbine 20 includes a volute section 32 which receives exhaust gas from exhaust manifold 16 via line 24. Volute section 32 may be in the form of a single volute as shown, or may be in the form of a split volute or other configuration, depending upon the particular application. Exhaust gas enters volute section 32 and impinges against a plurality of vanes 34 of turbine wheel 26. Turbine wheel 26 is thus rotatably driven by exhaust gas from exhaust manifold 16. The spent exhaust gas flows to a muffler system (not shown) downstream from turbocharger 10, as indicated by directional arrow 36.

Two stage compressor 22 includes a first compressor 38 and a second compressor 40. First compressor 38 and second compressor 40 each include a compressor wheel 42 and 44, respectively. Two stage compressor 22 receives combustion air as indicated by arrow 46. First compressor wheel 42 and second compressor wheel 44 compress the combustion air in a series manner to provide a desired total compression ratio. Second compressor wheel 44 discharges the compressed combustion air into a volute section 48 which is fluidly coupled with inlet manifold 18 as indicated schematically by line 50. Two stage compressor 22 thus provides compressed combustion air to inlet manifold 18.

According to an aspect of the present invention, a conduit 52 fluidly interconnects volute section 48 of two stage compressor 22 with volute section 32 of turbine 10. A valve 54 is positioned within conduit 52, and is controllably actuated to open and close conduit 52. Conduit 52 fluidly couples with and extends in a radially outward direction from a radially outer portion of volute section 48. Moreover, conduit 52 fluidly couples with a low static pressure region of volute section 32 of turbine 20. Conduit 52 is disposed at an acute angle relative to a high velocity portion of volute section 32.

A controller 56 is electrically coupled with valve 54 via line 58. Controller 56 is also electrically coupled with one or more sensors 60 via an associated line 62 and receives an input signal therefrom. Sensor 60 senses an operating parameter associated with operation of turbocharger 10 and/or internal combustion engine 12 indicative of a surge condition within turbocharger 10.

INDUSTRIAL APPLICABILITY

During use, internal combustion engine 12 operates in known manner using, e.g., the diesel principle of operation. Exhaust gas is transported from exhaust manifold 16 to volute section 32 of turbine 20 via line 24. The exhaust gas impinges upon vanes 34 of turbine wheel 26 and rotatably drives turbine wheel 26. Spent exhaust gas is discharged to a muffler system, as indicated by arrow 36. Rotation of turbine wheel 26 in turn causes rotation of shaft 30 which drives first compressor wheel 42 and second compressor wheel 44. Combustion air or a fuel/air mixture is drawn into first compressor 38, as indicated by arrow 46. The combustion air or fuel/air mixture is compressed in a series manner within two stage compressor 22 using first compressor wheel 42 and second compressor wheel 44. The compressed combustion air or fuel/air mixture is discharged from volute section 48 of second compressor 40 to inlet manifold 18 via line 50.

Sensor 60 senses one or more operating parameters associated with internal combustion engine 12 and/or turbocharger 10 indicative of a surge condition within turbocharger 10 and provides an output signal to controller 56 via line 62. For example, one or more sensors 60 may be provided to sense engine speed, fuel consumption rate, ambient temperature, air temperature at the inlet to first compressor 38, air flow through two stage compressor 22, temperature of compressed air at the outlet of first compressor 38, rotational speed of shaft 30, engine inlet manifold temperature, engine inlet manifold pressure, ratio of air-to-fuel in inlet manifold 18, and/or oxygen in exhaust manifold 16. Of course, the exact placement location of sensor 60 within internal combustion engine 12 and/or turbocharger 10 will vary, dependent upon the specific operating parameter being sensed. For example, sensor 60 may be positioned adjacent to a crankshaft (not shown) of internal combustion engine 12 for sensing the engine speed; or may be positioned within the inlet to first compressor 38 or the outlet from second compressor 40 for sensing air flow through two stage compressor 22. If configured to sense air flow, sensor 60 may be configured as a hot wire annemometer. Controller 56 determines the onset or existence of a surge condition within turbocharger 10 and controllably actuates valve 54 by outputting a signal over line 58. When valve 54 is in an open state, compressed combustion air or a compressed fuel/air mixture within volute section 48 is bled through conduit 52 to volute section 32 of turbine 20. Rather than bleeding to the ambient environment, the compressed combustion air or fuel/air mixture is transported to volute section 32 of turbine 20 to utilize some of the energy within the compressed air or fuel/air mixture.

Dependent upon the particular operating conditions of internal combustion engine 12, it is not possible with conventional turbochargers to bleed air from a compressor to a turbine. For example, under a low load condition the rotational speed of shaft 30 is not high enough to sufficiently compress the combustion air or fuel/air mixture drawn into two stage compressor 22. Thus, the pressure of exhaust gas within volute section 32 of turbine 20 may be higher than the pressure of the compressed air or fuel/air mixture within volute section 48. If valve 54 is opened by controller 56 under such operating circumstances, flow actually is reversed and exhaust gas flows from volute section 32 of turbine 20 to volute section 48 of two stage compressor 22.

To ensure that a positive pressure differential exists between two stage compressor 22 and turbine 20, conduit 52 is coupled with two stage compressor 22 at a location of maximum total pressure, and is coupled with turbine 20 at a location of minimum static pressure. According to principals of fluid dynamics, the total pressure at any location within two stage compressor 22 or turbine 20 is the sum of both the dynamic pressure and the static pressure. The dynamic pressure is a function of the square of the flow velocity at any selected location. Thus, the faster the flow velocity the greater the dynamic pressure and the smaller the static pressure. For example, flow transported through a venturi section increases in velocity resulting in an increased dynamic pressure and decreased static pressure. Conduit 52 is coupled with two stage compressor 22 and turbine 20 to take advantage of these differing pressure components making up the total pressure within either two stage compressor 22 or turbine 20. Conduit 52 is coupled with two stage compressor 22 at a location of maximum total pressure and is coupled with turbine 20 at a location of minimum static pressure so that compressed air or a fuel/air mixture can be bled from two stage compressor 22 to turbine 20 over the widest range of operating conditions.

In the embodiment shown, conduit 52 is coupled with volute section 48 of second compressor 40 at the radially outer portion of volute section 48. At the radially outer portion of volute section 48 the flow velocity is the lowest resulting in the maximum static pressure. By connecting conduit 52 with an end receiving the high static pressure flow, the compressed air or fuel/air mixture is blown into conduit 52 which allows bleeding to occur over a wider range of operating conditions. Conduit 52 is also coupled with turbine 20 at the radially outer portion of volute section 32. The dynamic pressure is at a maximum which results in a minimum static pressure. However, conduit 52 opens generally perpendicular to rather than in the flow of the exhaust gas. This means that conduit 52 is exposed principally to the low static pressure in volute section 32 rather than the high dynamic pressure. Compressed air or a fuel/air mixture may thus be bled from two stage compressor 22 to turbine 20 over a broader range of operating conditions. As an alternative, it is also possible to connect conduit 52 with turbine 20 at a venturi section where the flow is at an increased velocity and decreased static pressure. For example, volute section 32 may be configured with a flow constriction causing a local increase in velocity and decrease in static pressure.

The present invention allows more effective bleeding of compressed combustion air or a fuel/air mixture from a compressor to a turbine over a wider range of operating conditions. The bleeding may occur over normal operating conditions, or under low load conditions. The on-set or existence of a surge condition is sensed and the bleeding is automatically effected to prevent or eliminate surging within the turbocharger.

Other aspects, objects and advantages of this invention can be obtained from a study of the drawings, the disclosure and the appended claims.

What is claimed is:

1. A turbocharger for an internal combustion engine, comprising:
   a turbine including a turbine volute section having a low pressure region of minimum static pressure;
   a compressor including a compressor volute section having a high pressure region of maximum static pressure;
   a conduit fluidly interconnected to said high pressure region of said compressor volute section and to said low pressure region of said turbine volute section; and
   a valve associated with said conduit for opening and closing said conduit.

2. The turbocharger of claim 1, said compressor volute section high pressure region being a radially outer portion of said compressor volute section.

3. The turbocharger of claim 1, said conduit being connected with said compressor volute section high pressure region at an angle of at least 90 degrees relative to a radial direction through said high pressure region.

4. The turbocharger of claim 1, said turbine volute section low pressure region being a high velocity portion of said turbine volute section.

5. The turbocharger of claim 4, said conduit connected with and extending at an acute angle to said high velocity portion of said turbine volute section.

6. The turbocharger of claim 1, said compressor including a two stage compressor with a first compressor and a second compressor, said high pressure region being a radially outer portion of said second compressor.

7. The turbocharger of claim 6, said turbine volute section low pressure region being a high velocity portion of said turbine volute section, said conduit connected with and extending at an acute angle to said high velocity portion of said turbine volute section.

8. The turbocharger of claim 1, said valve being positioned within said conduit.

9. An internal combustion engine, comprising:
   an exhaust manifold;
   an inlet manifold;
   a turbine fluidly coupled with said exhaust manifold and including a turbine volute section having a low pressure region of minimum static pressure; and
   a compressor fluidly coupled with said inlet manifold and including a compressor volute section having a high pressure region of maximum total pressure;
   a conduit fluidly interconnecting said high pressure region of said compressor volute section to said low pressure region of said turbine volute section; and
   a valve associated with said conduit for opening and closing said conduit.

10. The internal combustion engine of claim 9, said compressor volute section high pressure region being a radially outer portion of said compressor volute section.

11. The internal combustion engine of claim 9, said turbine volute section low pressure region being a high velocity portion of said turbine volute section.

12. The internal combustion engine of claim 11, said conduit connected with and extending at an acute angle to said high velocity portion of said turbine volute section.

13. The internal combustion engine of claim 9, said compressor including a two stage compressor with a first compressor and a second compressor, said high pressure region being a radially outer portion of said second compressor.

14. The internal combustion engine of claim 13, said turbine volute section low pressure region being a high velocity portion of said turbine volute section, said conduit connected with and extending at an acute angle to said high velocity portion of said turbine volute section.

15. The internal combustion engine of claim 9, said valve being positioned within said conduit.

16. A method of operating a turbocharger in an internal combustion engine, comprising:
   providing a turbine coupled with a compressor;
   driving said turbine with exhaust gas from an exhaust manifold of the internal combustion engine;
   rotatably driving said compressor with said turbine;
   transporting combustion air through a high pressure region of maximum total pressure within a volute section of said compressor;
   transporting exhaust gas through a low pressure region of minimum static pressure within a volute section of said turbine;
   fluidly interconnecting a conduit between said high pressure region of said compressor volute section and said low pressure region of said turbine volute section; and
   operating a valve associated with said conduit to selectively open and close said conduit.

17. The method of claim 16, said compressor including a two stage compressor with a first compressor and a second compressor, and said first transporting step being carried out within a radially outer portion of said second compressor.

18. The method of claim 17, said second transporting step being carried out within a high velocity portion of said turbine volute section, and said fluidly interconnecting step including connecting said conduit at an acute angle with said high velocity portion of said turbine volute section.

* * * * *